Aug. 5, 1958  J. C. YACOE  2,846,290
SLURRY PROCESS FOR THE MANUFACTURE OF HYDROGEN FLUORIDE
Filed Nov. 28, 1955
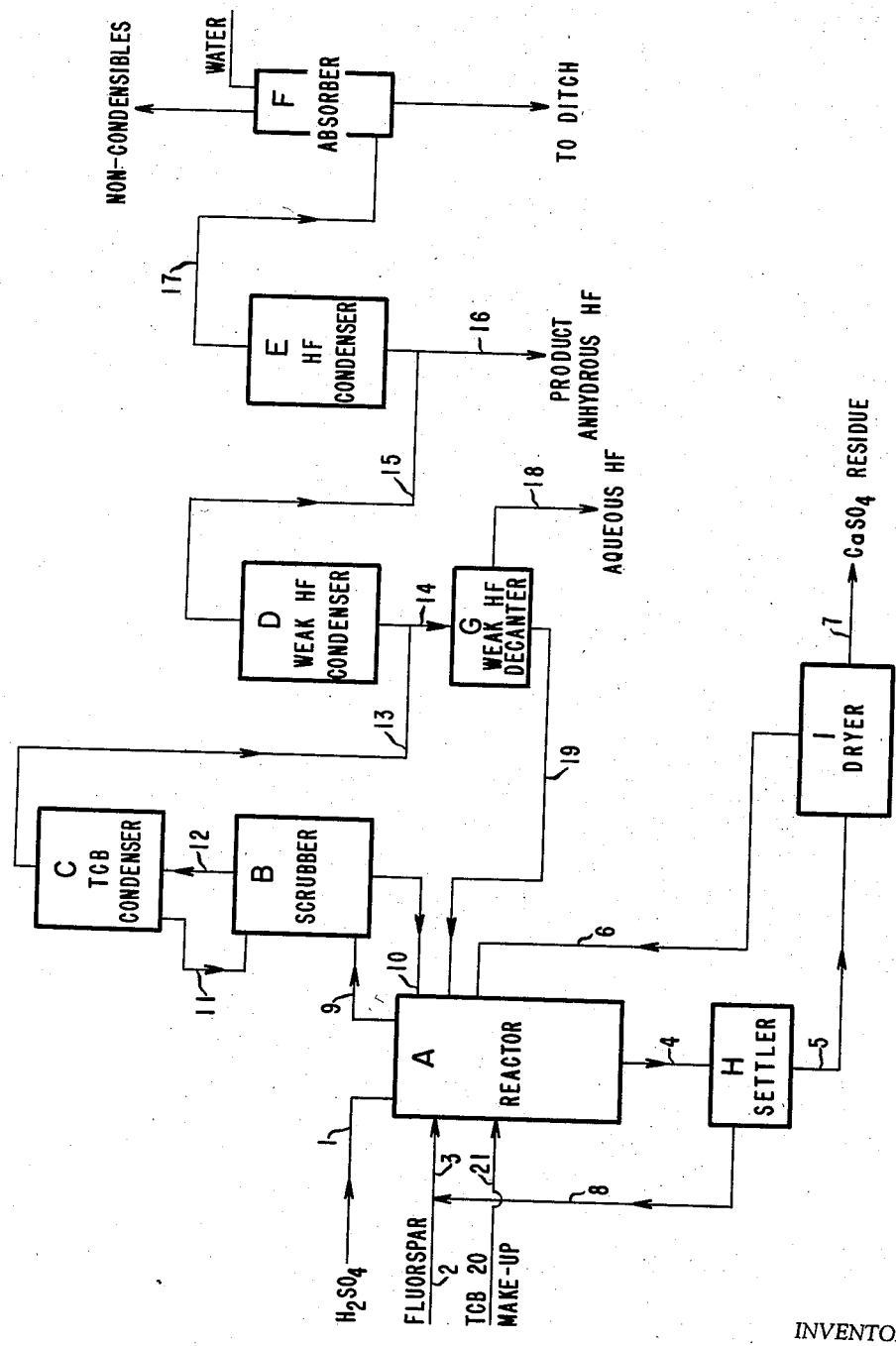
INVENTOR
J. C. YACOE
BY *Walter H. Steinbauer Jr.*
ATTORNEY

United States Patent Office 2,846,290
Patented Aug. 5, 1958

2,846,290

SLURRY PROCESS FOR THE MANUFACTURE OF HYDROGEN FLUORIDE

Jesse Craig Yacoe, Wilmington, Del., assignor to E. I. du Pont de Nemours and Company, Wilmington, Del., a corporation of Delaware Application November 28, 1955, Serial No. 549,401

10 Claims. (Cl. 23—153)

This invention is directed to a process wherein an inert diluent is utilized to transfer heat in the reaction of sulfuric acid with a suitable metal fluoride.

Hydrogen fluoride is a vital intermediate in the manufacture of "Freon" fluorinated hydrocarbon refrigerants and propellants as well as other valuable fluorochemicals, and is generally produced commercially by heating fluorspar ($CaF_2$) with concentrated sulfuric acid. Some of the important factors which determine whether the reaction of sulfuric acid with a fluoride such as fluorspar will go to completion are: the fineness (particle size) of the fluorspar, the concentration of acid used, the ratio of reactants, the temperature and the time allowed for reaction, and the intimacy of mixing of the acid and fluorspar reactants. Satisfactory control over the mixing of the acid and fluorspar is perhaps the most difficult to achieve since it depends on the efficiency of a mechanical mixing device. It is known that mixing concentrated sulfuric acid with fluorspar produces a thick pasty or putty-like mass which, on being heated, evolves hydrogen fluoride. This putty-like mass is difficult to mix and the transfer of heat through it is very slow. Since the reaction is endothermic heat transfer is the most important factor. Accordingly, a better mixing of the reactants and a more efficient heat transfer to and through the reaction mass would result in a more efficient process.

Typical solutions suggested in the prior art include the use of specially designed retorts for the manufacture of hydrogen fluoride. These retorts are generally long cylindrical tanks that are heated and either rotated or internally agitated with plows for mixing the putty-like mass obtained when fluorspar and sulfuric acid are fed into the retort. Heating and mixing promote the formation of hydrogen fluoride. Temperatures as high as 300° C., as described by Lawrence in U. S. 2,047,210 have been used to achieve high conversions of fluorspar and a reasonable rate of production of hydrogen fluoride.

Since sludge and scale gradually coat the inner surface of the metal retort, and since this deposit is a good insulator, the transfer of heat from the outside source of heat to the interior contents of the retort is poor. Therefore, it is not unusual to find, even in the more efficient present day retorts, that although the product stream of hydrogen fluoride may exit at temperatures as low as 150–250° C., the walls of the retort are as hot as 400–500° C. One result of the greater temperature differential between the wall and the reactants within the retort is higher operating cost. Another is increased rate of corrosion of the inner wall surface at the higher temperatures.

It is an object of this invention to provide a process for the manufacture of hydrogen fluoride in either a batch or continuous operation, the hydrogen fluoride being prepared from alkali-metal fluoride or alkaline-earth-metal fluoride.

It is a further object of this invention to provide a process for the preparation of hydrogen fluoride which process can be performed in conventional chemical processing equipment under relatively mild conditions.

The present invention relates to a process for the preparation of hydrogen fluoride by reacting sulfuric acid with an alkali-metal or alkaline-earth-metal fluoride in approximately stoichiometric quantities in the presence of an inert liquid diluent, at least 0.67 part of diluent being employed for every one part of metal sulfate formed in the reaction, and maintaining the reaction temperature at 100–200° C. and recovering hydrogen fluoride from the gaseous product stream.

In one embodiment of the present invention, sulfuric acid is reacted with fluorspar at a temperature within the range of 150° to 200° C. in the presence of at least 0.67 part 1,2,4-trichlorobenzene as diluent, 0.67 to 9 parts diluent being used for each part of calcium sulfate formed.

Improvement in the production of hydrogen fluoride is realized when the reaction of sulfuric acid and fluorspar is carried out in an inert liquid diluent. The diluent serves as a heat transfer agent for the reaction in addition to permitting efficient mixing of the reactants by conventional means and aiding in the dispersion of the salt products. As a result, formation of hydrogen fluoride proceeds easily and rapidly at relatively low temperatures in simplified equipment.

The present process, which is adaptable to both batch and continuous operations, applies to the preparation of hydrogen fluoride from any alkali-metal or alkaline-earth-metal fluoride. Because of its low cost, the mineral fluorspar, which is essentially calcium fluoride, is preferred.

The quality and quantity of acid and mineral fluoride employed in the present invention are substantially as described by Lawrence in U. S. 2,047,210 for the retort process. Especially desirable results are obtained with good grades of fluorspar. To obtain pure hydrogen fluoride, the metal fluoride should be substantially free of moisture and silica to avoid dilution of the product and contamination with silicon tetrafluoride. In practice commercially available "acid-grade" fluorspar is preferred for its low silica content and may be of any particle size normally used in commercial production of HF, e. g., an acid-grade fluorspar characterized in the trade as "70% through 200 mesh," "77% through 200 mesh," etc. Still finer fluorspar, e. g., of particle size of about 4 microns obtained on further grinding, may be used. The sulfuric acid should have a concentration of at least 90%, with 95–100% acid preferred when anhydrous hydrogen halide is desired. With greater than 100% sulfuric acid (based on $SO_3$ content) the evolved hydrogen fluoride becomes unduly contaminated with sulfur trioxide because of the high vapor pressure of this substance at the higher temperatures.

The mineral fluoride and sulfuric acid are used in approximately stoichiometric quantities, with the acid generally in from 0 to 10% excess, preferably 2–5%, based on complete conversion of halide, e. g.,

$$CaF_2 + H_2SO_4 = 2HF + CaSO_4$$

Although calcium fluoride may be used in excess it is more economical to have the less costly acid in excess to assure substantially complete conversion (90% and greater) of the fluorspar.

Instead of sulfuric acid, other acids such as phosphoric, fluorsulfonic and sodium hydrogen sulfate may be employed; however, said acids do not possess the advantages of sulfuric acid itself as indicated by Lawrence in U. S. 2,047,210.

A satisfactory medium for carrying out the new process is trichlorobenzene. By "trichlorobenzene" is meant all the isomeric trichlorobenzenes, preferably those that are liquid at room temperature (e. g. 1,2,4-trichlorobenzene, and liquid mixtures of the isomers). A useful mixture, obtained for example by chlorinating benzene, boils at from about 200° to 220° C. at normal pressure. Even at temperatures at or near its boiling point, 1,2,4-trichlorobenzene, for example, is sufficiently inert in the presence of the reactants and reaction products to be used over and over again. This is somewhat surprising since trichlorobenzene with sulfuric acid alone is readily sulfonated at 200° C. However, under the conditions of the process (in the presence of fluorspar) sulfonation occurs only to the extent of 1% or less of the trichlorobenzene used; accordingly, the process is economical and practical.

The diluent trichlorobenzene serves as a reaction medium and as a means of transporting fluorspar into the reactor and calcium sulfate from the reactor. Slurries consisting of from 10 to 70% of fluorspar by weight of slurry, most preferably from 20 to 50%, are economically and easily handled. "Thicker" slurries are less easily pumped from storage tank to reactor. To generate hydrogen fluoride, sulfuric acid (2 parts) is added to a slurry of fluorspar (1.6 parts) in trichlorobenzene, under agitation and maintained at the desired temperature (100–200° C.); or, separate streams of sulfuric acid and fluorspar-trichlorobenzene slurry are simultaneously mixed at the proper temperature. The latter method is adaptable to batch or continuous operations. Also, but less desirable, a cold pre-mix of fluorspar and acid alone or slurried in cold trichlorobenzene may be added to the reactor containing hot trichlorobenzene.

In contrast to the putty-like mass encountered in the absence of diluent, the slurry of reactants in the hot trichlorobenzene is easily stirred, even with a simple anchor-type agitator, and the reaction proceeds smoothly. Heat transfer is excellent and as a result of the greatly improved heat transfer and mixing in the presence of diluent, the process temperatures are lower than for existing processes and residence times are comparable or less, while conversions of the fluorspar and yields of hydrogen fluoride remain high. In the absence of diluent the reactant hold-up time is often fairly high, and, in order to reduce this residence time in a plow-agitated retort, for example, temperatures well in excess of 200° C. are generally employed. The pronounced superiority in heat transfer in this new process is clearly indicated by the fact that the temperatures inside and outside the reactor differ by as little as 5° C. or less when operating at 175–180° C.; operating costs are thus reduced.

The product gases issuing from the reactor enter a dephlegmator where the bulk of the diluent in the vapor condenses and returns to the reactor, while the HF passes through to the recovery system. Concentrated or anhydrous HF may be recovered essentially as described in U. S. 2,047,210 or by any similar and suitable means involving condensation, fractional distillation, etc., known in the art.

The slurry of calcium sulfate in trichlorobenzene which remains on completion of the reaction is sufficiently fluid to be pumpable from the reactor even at concentrations of solids of up to about 60%.

The total quantity of diluent then will be that quantity sufficient to produce slurries consisting of about 10–60%, preferably 15–35% $CaSO_4$. Larger quantities of diluent necessitate reactors of larger volume in order to achieve the same unit production of hydrogen fluoride. With smaller quantities of diluent the reaction mass is less fluid, hence, less easily stirred and transported, and heat transfer through the mass and walls of the reactor is less efficient.

When the process is operated continuously, the discharge of solid product as slurry in diluent provides an effective seal for preventing loss of hydrogen fluoride from the reactor. The bulk of the trichlorobenzene is recovered from the discharged mass by filtration, decantation, or centrifugation, etc., and the remainder adhering to the sludge is recovered by evaporation. Transport of solids to and from the reactor is accomplished with a minimum of handling losses. Furthermore, the steps of adding reactants, agitating and transporting the solid-diluent slurries are performed in conventional processing equipment. The equipment is easily cleaned, since solid cakes of by-products and unreacted metal halide do not build up on the walls of the reactor and on the agitator.

From the foregoing, it is apparent that for best results a suitable diluent must be thermally stable in the operating temperature range, reasonably inert towards the reactants and the products, and, less volatile than the hydrogen fluoride but sufficiently volatile so that it can be recovered from the solid reaction products by distillation. The diluent should be liquid at about 100° C., preferably at about 20° C. and above for economy and ease of handling the solid-liquid slurries, and, said diluent should be capable of remaining in the liquid state up to about 200° C. at a practical pressure. Trichlorobenzene meets these requirements. Other halogenated organic compounds such as the monochloro- and dichlorobenzenes may be employed; however, said compounds are definitely less preferable than trichlorobenzene. Introduction of halogen into an aromatic compound deactivates the nucleus towards further electrophilic attack. In this regard, dichlorobenzene is more resistant to sulfonation under conditions of the process than is monochlorobenzene and is therefore a more satisfactory diluent. In contrast to the chlorinated benzenes, aliphatic chloro and polychlorohydrocarbons, e. g., carbon tetrachloride, are not practical as they are not suitably inert under the operating conditions.

For ease of recovery of the diluent from the residual calcium sulfate sludge by distillation, it is preferred to employ diluents boiling not higher than 230° C. at atmospheric pressure. Therefore, higher boiling compounds are considered economically impractical.

Temperatures employed in this process will be from about 100° C. to about 200° C., and preferably at about 175° C. The putty-like mass obtained on mixing concentrated sulfuric acid with fluorspar shows noticeable evolution of hydrogen fluoride at about 60–70° C. and increasingly rapid evolution at higher temperatures. Above 100° C. the rate of formation of gaseous hydrogen fluoride is already reasonably rapid to be practical. Temperatures of much above 200° C. are undesirable since any increase in rate is offset by increased heating costs and increased corrosion rate of the steel reactor.

In one embodiment, the process is carried out at atmospheric pressure in trichlorobenzene. If desired, a vacuum can be applied to the system to facilitate removal of gaseous products, or, the reaction can be run under pressure. Pressures greater than atmospheric pressure are required when operating above the normal boiling points of relatively low-boilers, such as chlorobenzene, to maintain the diluent at or below its boiling point at the higher pressure. As in the retort process of Lawrence (U. S. 2,047,210), the pressure should preferably be such that, under the temperature conditions used, substantial condensation of the hydrogen fluoride does not occur in the reaction zone.

Pressures up to 250 pounds per square inch are practical in simple equipment. Advantages in pressure operations are lower heating costs and lower refrigeration costs for condensing HF, since (1) less heat is wasted as heat of vaporization of the diluent and since (2) HF can be condensed at higher temperatures because of its higher boiling point at higher pressures, i. e., in a water-cooled or air-cooled condenser rather than in a refrigerated (e. g., brine-cooled) condenser.

The boiling point of the diluent and the temperature at which it is desired to operate the new process will also determine the operating pressure. It should boil sufficiently higher than hydrogen fluoride at any of the operating pressures to assure clean-cut separation of hydrogen fluoride from diluent. This is easily done when trichlorobenzene is the diluent.

As stated above, the process can be operated batchwise or continuously, as no special equipment is required since all operations can be performed in the conventional chemical processing equipment.

In the accompanying drawing, the present invention is illustrated in a continuous process flow sheet. The unit consists of a reactor A, a system for treating the vapor-product stream (scrubber B, diluent-condenser C) and for recovering HF from the product stream (weak HF condenser D, decanter G, HF condenser E, absorber F), and a system for separating diluent from solid product (settler H) and for recovering occluded diluent from solid product (dryer I).

Reactor A, a steel vessel, accommodates an agitator (anchor or paddle type or a shaft having a number of stratified discs) and a heating means (an electrical unit or a surrounding jacket through which hot liquid or gas, steam, etc., may be circulated). Reactor A is fitted with the necessary inlets and outlets for admitting reactants and diluent (including recycled and recovered diluent), for removing the vapor-product stream, and for discharging the liquid-solid contents from reactor A.

Stream 1 feeds sulfuric acid into reactor A. The source of solid fluorspar is stream 2, and the original slurry to be fed into the reactor comprises this fluorspar and diluent from source 20 (which can also supply diluent to the reactor as needed through stream 21). In continuous operation the fluorspar is slurried in diluent from stream 8 (returning from settler H) and the slurry is admitted to reactor A via stream 3; diluent from stream 8, in excess of that used to make up the slurry, can also be fed to the reactor via stream 21. Stream 9 joins reactor A to scrubber B which in turn is joined to condenser C through stream 12. B and C, like A, are made of steel. B is packed with Raschig rings of carbon, with lumps of coke or with other corrosion-resistant material and its primary function is to remove entrained solid. It is also a dephlegmator and in this way is part of the diluent condensing system. Diluent condensed in C flows via stream 11 through B and returns from B as stream 10 to reactor A.

The uncondensed product stream issuing from condenser C through stream 13 passes into the HF recovery system. This system is similar to that described by Lawrence in U. S. 2,047,210 and for the sake of completeness is described here. Aqueous HF and any remaining diluent are condensed in D (the "weak-HF" condenser made of Monel metal), the condensate flowing (stream 14) to decanter G from which any recovered diluent is returned to reactor A as stream 19. Weak HF is drained as stream 18. The remaining gaseous product enters (stream 15) steel condenser E where substantially anhydrous HF is condensed and recovered (stream 16). Any uncondensed gas (stream 17) is scrubbed with water in absorber F before being vented to the atmosphere.

The liquid-solid contents of reactor A are withdrawn (stream 4) and sent to settler H where diluent is decanted from calcium sulfate sludge and returned via 8 to reactor A as described. Stream 5 conveys sludge to dryer I where occluded diluent is recovered by evaporation and returned as stream 6 to reactor A. Recovered calcium sulfate exits as stream 7 from the dryer.

The rate of flow of materials into or out of the reactor and recovery systems is controlled by suitable valves, not shown. The necessary valves and pumps needed to adapt the unit to reduced or super-atmospheric pressure operations can be installed.

The following examples illustrate the invention in detail. The parts used are by weight. Trichlorobenzene is designated as TCB.

EXAMPLE 1

In carrying out the process of this invention in a continuous manner 1 part of "77% through 200 mesh" acid-grade fluorspar (97 parts $CaF_2$, 1 part $SiO_2$, 1 part $BaSO_4$ and 1 part $CaCO_3$) is mixed with 1.4 parts of 1,2,4-trichlorobenzene and charged as a slurry into reactor A. Simultaneously 99% sulfuric acid is fed to the reactor in the ratio of 2.1 parts of sulfuric acid to 1.6 parts of solid fluorspar (entering the reactor as slurry as described above). The reaction mass is continuously agitated and its temperature is maintained at 175° C. by external heat. The reaction mass is maintained at solids content of 1 part solids (calculated as $CaSO_4$) to 2.7 parts trichlorobenzene by introducing TCB as needed. While maintaining the stoichiometric relationship, the reactants are added at such a rate that the solid withdrawn from the bottom of the reactor is essentially $CaSO_4$. Highest conversions of the fluorspar to HF and $CaSO_4$ are obtained when the residence time in the continuous process is at least 0.5 hour or greater. (It should be noted that in general the finer the spar the shorter is the residence time.)

The vapor product, composed of 100 parts TCB, 17 parts HF, 0.6 part $SiF_4$, 0.7 part $H_2O$ and 0.04 part $H_2SO_4$, leaves the reactor at 175° C. and enters first scrubber B and then condenser C where the bulk of the vaporized TCB condenses. Entrained solids are removed in B by scrubbing the vapor stream with the return flow from C; the liquid returning to reactor A from C through B is essentially trichlorobenzene. The vapor product leaving condenser C is at about 125° C. and is composed of 100 parts HF, 70 parts TCB, 3.6 parts $SiF_4$, 3.8 parts $H_2O$, and 0.22 part $H_2SO_4$. In "weak HF" condenser D water is next removed as aqueous HF (1 part HF, 1.8 parts $H_2O$ and 0.1 part $H_2SO_4$) and the remaining TCB is also condensed. Separation of this two-phase condensate takes place in decanter G, the TCB being recycled to reactor A. The vapor stream, now consisting of 100 parts HF, 2.7 parts $SiF_4$, and 0.5 part $SO_2$, passes at 35° C. to the anhydrous condenser E. Here the product is condensed to a liquid consisting of 100 parts HF, 0.5 part $SO_2$ and a trace of sulfuric acid. Uncondensed gas (1 part HF and 2.6 parts $SiF_4$) leaves E at 5° C. After being contacted with water in adsorber F it is vented to the atmosphere.

The solid reaction products are continuously withdrawn as a slurry in TCB from the bottom of reactor A and sent to settler H. In the settler, liquid TCB is decanted from the sludge. This recovered TCB is used to slurry more fluorspar and the excess over that required for slurrying is sent directly to reactor A. Make-up TCB is added as required to keep a constant inventory. The sludge is conveyed to dryer I to vaporize its TCB content, the TCB being returned to reactor A. The residue is discharged from the dryer at 250° C. and analyzes as 100 parts $CaSO_4$, 1.8 parts $CaF_2$, 0.26 part TCB, 2.65 parts $H_2SO_4$, 0.6 part $BaSO_4$; a fluorspar conversion to HF of 98% is achieved.

In general, the present invention results in a fluorspar conversion to HF 92 to 99%, yields of HF are 90% and above while the trichlorobenzene loss is estimated at 1 part per 100 parts of HF product.

It will be noted that the slurry of fluorspar in TCB charged to the reactor (1 part spar and 1.4 parts TCB) corresponds to about 41.7% of spar by weight of slurry. Although about 40–50% is preferred, from very dilute to 70% by weight of spar can be employed. It will also be noted that the solid content as $CaSO_4$ in the reactor is maintained at about 1 part per 2.7 parts TCB which corresponds to about 27% $CaSO_4$ by weight throughout the reaction mass. Higher percentages—up to 60%—can be readily withdrawn from the bottom of the reactor in a continuous manner. The reaction temperature can be varied from 100° to 200° C., with a temperature of at least 150° C. preferred.

EXAMPLES 2-14

These examples illustrate the batch-method. They also show the effect of process variables on the conversion of fluorspar to hydrogen fluoride. In these particular runs the acid is added to the slurry of fluorspar in 1,2,4-trichlorobenzene (TCB). Approximately 2 parts of sulfuric acid are required for 1.6 parts of fluorspar, calculated on a 100% basis. The quantity of acid employed here corresponds to about 10% excess based on the stoichiometry of the reaction; i. e., 2.2 parts acid to 1.6 parts spar in Examples 2-14.

EXAMPLE 2

To prepare hydrogen fluoride a mixture of 1 part of 1,2,4-trichlorobenzene and 0.425 part of acid-grade fluorspar ("77% through 200 mesh," having the composition given in Example 1) is charged into a steel reactor. The charge is stirred with an anchor agitator in conjunction with a number of one-inch steel balls. The temperature of the mass is raised to 175° C. by external heat and 0.421 part of 99% sulfuric acid per part of TCB-fluorspar slurry are added over 5 to 10 minutes. The product gas is passed through a scrubber and condenser (to return TCB) and thence to an HF recovery system as described in Example 1 for the continuous process. The reaction mass is held at 175° C. for 60 minutes and then filtered. Analysis of the filter cake for calcium sulfate and calcium fluoride shows the conversion is 97% based on the $CaF_2$ content of the fluorspar.

EXAMPLES 3-14

Following the same general procedure given above in Example 2, runs were made with the reaction time varying from 5 to 60 minutes; reaction temperatures ranging from 125° C. to 200° C.; fluorspar fineness from "77% through 200 mesh" to 4 micron particle size; and the fluorspar TCB ratio ranging from 0.455 to 0.291. As in Example 2, at the end of the time allotted for the reaction at any of the temperatures employed, the reaction mixture was filtered and the filter cake was analyzed to determine the fluorspar conversion. The results are summarized in the accompanying table.

*Summary of Examples 3-14*

| Example | Temp., °C. | Reaction Time, Minutes | Spar Fineness | Spar/TCB Ratio | Conversion |
|---|---|---|---|---|---|
| 3 | 125 | 10 | 77% through 200 mesh | 0.455 | 81.4 |
| 4 | 125 | 20 | 77% through 200 mesh | 0.425 | 86.9 |
| 5 | 125 | 40 | 4 micron | 0.355 | 98.8 |
| 6 | 140 | 5 | 77% through 200 mesh | 0.425 | 84.7 |
| 7 | 150 | 10 | 77% through 200 mesh | 0.425 | 86.3 |
| 8 | 150 | 20 | do | 0.455 | 98.8 |
| 9 | 150 | 40 | do | 0.455 | 96.5 |
| 10 | 150 | 60 | do | 0.455 | 97.0 |
| 11 | 175 | 15 | do | 0.400 | 89.0 |
| 12 | 175 | 60 | do | 0.291 | 99.3 |
| 13 | 200 | 15 | do | 0.425 | 96.9 |
| 14 | 200 | 15 | 4 micron | 0.425 | 99.6 |

The results show that high conversions are realized at temperatures 125 to 200° C. If temperatures between 100 and 125° C. are employed, conversions are lower for any of the times indicated in the table for any particular particle size. Nevertheless, the percent conversion increases, that is, approaches the theoretical value with increasing time of reaction. In general, as indicated above the smaller the particle size the higher is the conversion of the spar at the end of any reaction time. The fluorspar to TCB ratio is not critical. It may be varied widely with essentially the same overall results. The ratios given above, ranging from 0.291 to 0.455 correspond to about 22.5% to 31.3% of fluorspar by weight of slurry. These values, in turn, correspond to about 39.2% to 54.5% of calcium sulfate by weight of the final slurry. More dilute and more concentrated slurries of fluorspar and of calcium sulfate may be handled successfully. However, it is desirable for ease of stirring the mixture and handling the final calcium sulfate-slurry that the weight percent of calcium sulfate in the final slurry be less than 60%.

I claim:
1. A process for preparing hydrogen fluoride wherein sulfuric acid having a concentration of at least 90% is reacted with approximately a stoichiometric quantity of a reactant taken from the group consisting of alkali-metal fluorides and alkaline-earth-metal fluorides in the presence of chlorinated benzene as a diluent, at least 0.67 part diluent being present for each part of metal sulfate formed, the reaction temperature being maintained within the range of 100° to 200° C. and hydrogen fluoride recovered from the gaseous product stream.

2. The process of claim 1 wherein the sulfuric acid has a concentration within the range of 95 to 100%.

3. A process for preparing hydrogen fluoride wherein sulfuric acid having a concentration of at least 90% is reacted with approximately a stoichiometric quantity of fluorspar in the presence of trichlorobenzene as a diluent, at least 0.67 part diluent being present for each part of metal sulfate formed, the reaction temperature being maintained within the range of 100 to 200° C. and hydrogen fluoride recovered from the gaseous product stream.

4. The process of claim 3 wherein the reaction temperature is maintained within the range of 125 to 200° C.

5. The process of claim 3 wherein from 0.67 to 9 parts trichlorobenzene is present for each part of metal sulfate formed.

6. A process for preparing hydrogen fluoride wherein sulfuric acid having a concentration of at least 90% is reacted with approximately a stoichiometric quantity of fluorspar, in the presence of trichlorobenzene as a diluent, at least 0.67 part diluent being present for each part of calcium sulfate formed, the reaction temperature being maintained within the range of 125 to 200° C. at a pressure which is insufficient to condense vaporized HF formed in the reaction zone at the temperature employed and allowing the HF to vaporize from said reaction zone followed by recovering said HF from the gaseous product stream.

7. The process of claim 6 wherein the reaction temperature is about 175° C.

8. The process of claim 3 wherein the sulfuric acid has a concentration within the range of 95-100%.

9. The process of claim 6 wherein the sulfuric acid has a concentration within the range of 95-100%.

10. A process for preparing hydrogen fluoride wherein sulfuric acid having a concentration of at least 90% is reacted with approximately a stoichiometric quantity of calcium fluoride in the presence of trichlorobenzene as a diluent, at least 0.67 part diluent being present for each part of metal sulfate formed, the reaction temperature being maintained within the range of 125-175° C. and hydrogen fluoride recovered from the gaseous product stream.

References Cited in the file of this patent

UNITED STATES PATENTS

| | | |
|---|---|---|
| 1,150,415 | Bishop | Aug. 17, 1915 |
| 1,439,960 | Howard | Dec. 26, 1922 |
| 1,892,652 | Heath | Dec. 27, 1932 |
| 2,018,397 | Calcott et al. | Oct. 22, 1935 |
| 2,354,177 | Kawecki | July 18, 1944 |